Aug. 15, 1972   W. L. McCAMMON ET AL   3,684,458
PROPULSION AND PROCESSING APPARATUS FOR FLOWABLE MATERIALS
Filed Jan. 8, 1970                                              4 Sheets-Sheet 1
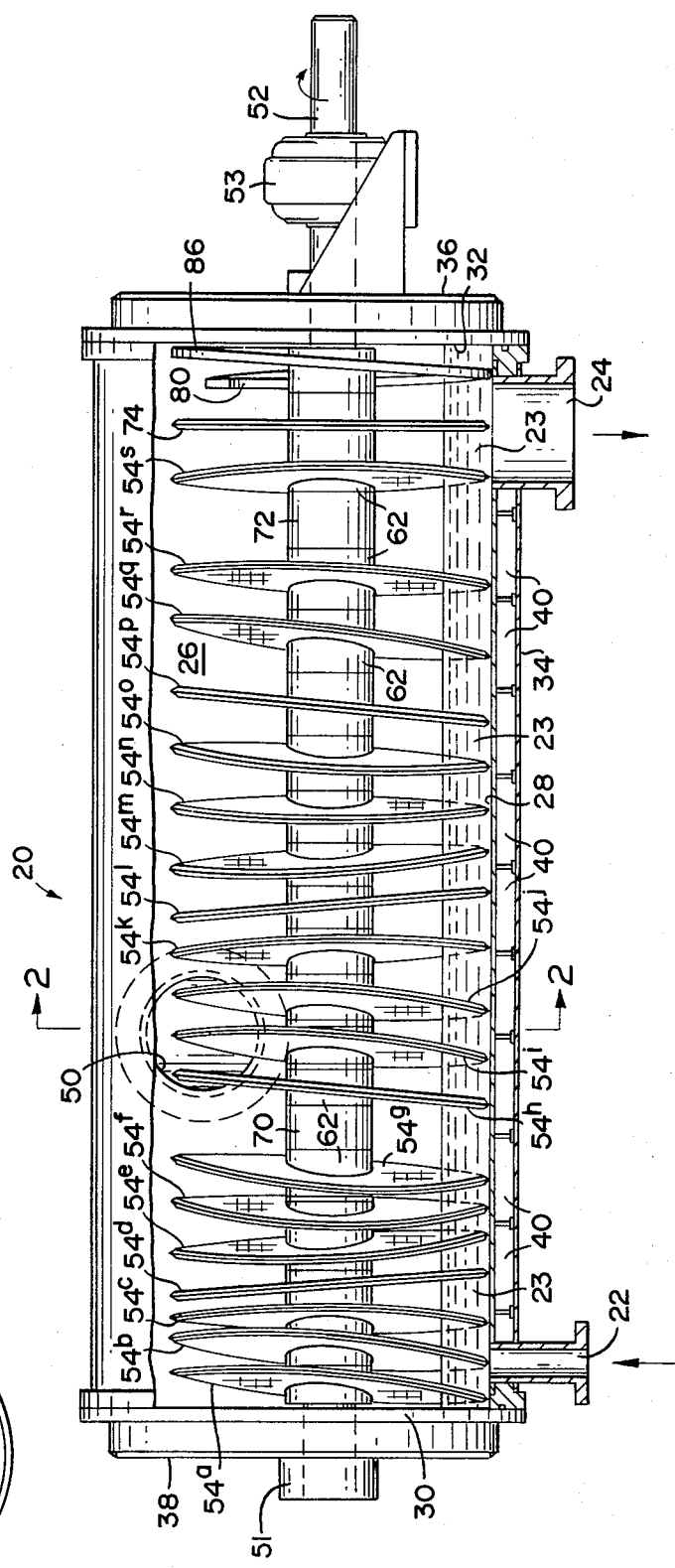
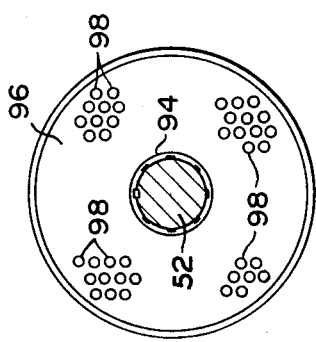

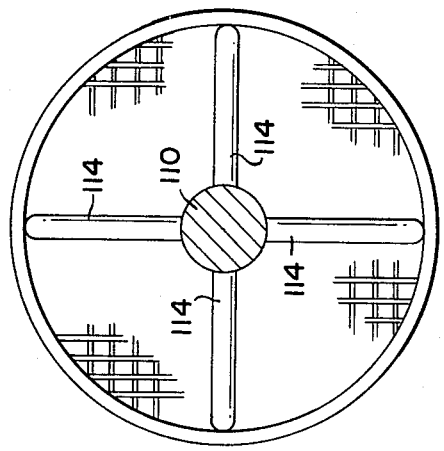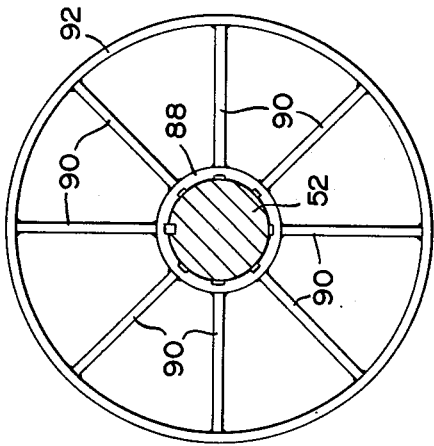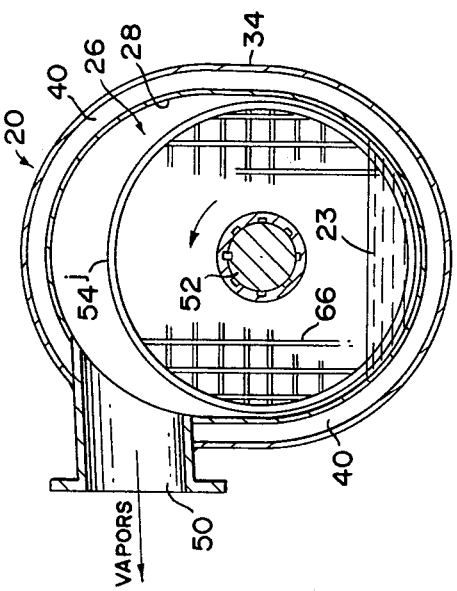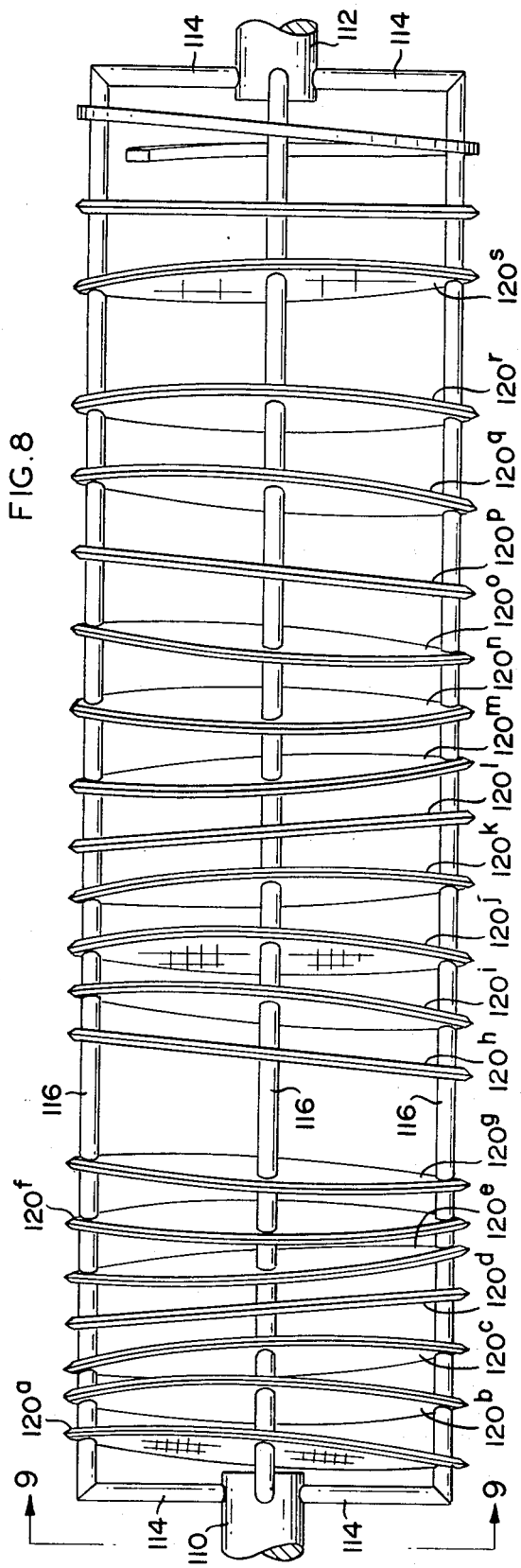

United States Patent Office 3,684,458
Patented Aug. 15, 1972

3,684,458
PROPULSION AND PROCESSING APPARATUS FOR FLOWABLE MATERIALS
William L. McCammon, Hopewell, and George E. Bishop, Colonial Heights, Va., assignors to The Firestone Tire & Rubber Company, Akron, Ohio
Filed Jan. 8, 1970, Ser. No. 1,419
Int. Cl. B01f 7/10; B65g 29/00; C08f 1/98
U.S. Cl. 23—285
14 Claims

ABSTRACT OF THE DISCLOSURE

A rotating structure having an array of discoidal members coaxially mounted thereon to rotate therewith. The discoidal members are inclined away from normality to the axis of rotation, and the most rearward points of the peripheries of the successive discs are disposed along a helicoidal line coaxial with the rotation of the structure, which disposition of the discs causes the structure as a whole to emulate the action of a screw in that the flowable material is propelled through the apparatus. Preferably, the discoidal members are foraminated, e.g. formed of perforated sheets or screening material.

FIELD OF THE INVENTION

This invention relates to apparatus for the carrying out of mixing and propelling of flowable materials in and through processing apparatus, such as polymerization apparatus, wherein flowable and viscous monomers and pre-polymers are accepted at the intake end of a polymerization vessel, are mixed, agitated, and propelled through the vessel to effect polymerization thereof, and the polymerized products are discharged at the outlet end of the vessel.

THE PRIOR ART

Flowable materials are conventionally propelled through processing apparatus by means of helicoidally formed worm flights and paddles, examples of such apparatus being shown in patents such as Zimmer 3,343,922; Helstrop 2,170,303 and Howe 3,279,895. Such devices present considerable problems in the fabrication of the helicoidal members, and in the mechanical attachment thereof to the driving shaft. Likewise there have been employed processing apparatus in which flowable material progresses by gravity flow through an apparatus, and is agitated during its progress by means of rotating foraminous discs, examples of this type being shown in Ryder 2,869,838 and Vodonik 2,758,915. These devices merely mix the materials, but do not propel them, so that the passage of the materials through the apparatus is sluggish and uncertain.

SUMMARY OF THE INVENTION

The present invention involves a rotary carrier such as a drive shaft, cage or the like having a row of substantially planar discoidal propulsion members mounted thereon to rotate therewith, the centers of the discoidal members being substantially at the axis of rotation of the carrier so that each discoidal member symmetrically surrounds that axis. Each of the discoidal members is inclined somewhat (say 1.5°–45°, and preferably 2°–20°) away from being normal or perpendicular in relation to the axis of rotation, so that one point, herein after designated the "trailing point," of the periphery of that member is closer to the intake end of the apparatus than any other point. The trailing points of the successive members are disposed along a line which is generally helicoidal, with the axis of the helicoidal line substantially coaxial with the axis of rotation of the carrier. The present inventors have found that the rotation of this assemblage will propel a flowable mass along the direction of the axis of rotation in the same direction as would a conventional worm conveyor having the same sense of rotation as the assemblage and having a helix of the same sense (left- or right-hand) as the helicoidal line of the trailing points of the propulsion members of this invention. This is rather unexpected, since by reasons of apparent symmetry, the individual discoidal members would not, in isolation, be expected to exert a net propulsion effect in either direction. The present structure is, of course, much simpler to design and construct than the helicoidally-formed worm flights and paddles of previous structures.

The individual discoidal elements employed in this invention may be formed of imperforate sheets, plates, etc. of metal or other material appropriate for contact with the materials to be processed. Preferably, however, for best mixing action, the members should be foraminated, being made for instance, of perforated sheets and plates, screening, or the like, or being in the form of openwork spoked wheels, etc.

The processing vessels of this invention, employing the above described propulsion structure, may be simple batch processing vessels in which the propulsion device merely propels the material in process around inside the processing vessel. Preferably, however, the processing vessels of this invention will operate upon continuous throughput, being adapted to receive the process material at an inlet end and to discharge the material at an outlet end, the rotary propulsion device serving to move the material from inlet to outlet, and to mix and agitate the same enroute. In such case, the process vessel walls are preferably, at least in their lower portions which are contacted or wetted by the process material, cylindrical so as to have close clearance with the rotating sweep of the discoidal propulsion members. Commonly, the vessels will be closed vessels, with provision for application of heat, pressure, vacuum, etc. as may be appropriate. A particularly useful embodiment of this type is a reactor for condensing polyester prepolymers to form high molecular weight polyesters.

It has been found with high viscosity fluids that this invention exhibits a greater degree of control of such reaction parameters as agitation, flow through vessel, surface regeneration, and material profile in the vessel. It should be noted that the tilt of the discoidal propulsion members results in increased shear through the process material and improved heat transfer from the heating media to the polymer. A particularly important result from the tilt on the discoidal propulsion members is that the film formed of material continuously flows through the openings in the members preventing stagnation of viscous material on the individual members.

DETAILED DESCRIPTION OF SPECIFIC EMBODIMENTS

With the foregoing general description in mind, specific embodiments will now be described in connection with the accompany drawings, wherein:

FIG. 1 is a front view, partly in section, of a chemical processing reactor according to this invention.
FIG. 2 is a sectional view along the line 2—2 of FIG. 1.
FIG. 3 is a front view of a propulsion device according to this invention, shown separately removed from FIG. 1.
FIG. 4 is a sectional view along the line 4—4 of FIG. 3.
FIG. 5 is a sectional view along the line 5—5 of FIG. 3.
FIG. 6 is a sectional view along the line 6—6 of FIG. 3.
FIG. 7 is a view of an alternative form of propulsion element for use in this invention.
FIG. 8 is a view of a construction of a propulsion device alternative to that of FIG. 2.

FIG. 9 is a sectional view along the line 9—9 of FIG. 8.

FIG. 10 is a view of another alternative form of a propulsion element for use in this invention.

Figure 3:
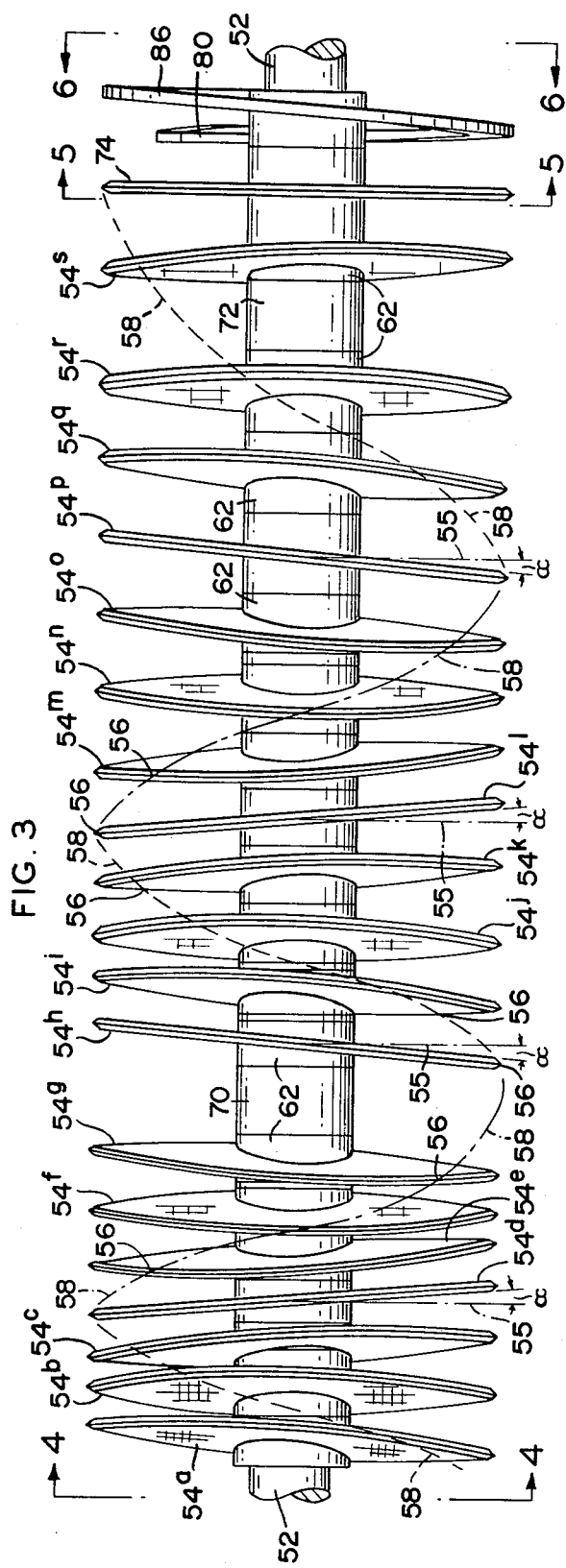

Referring now particularly to the drawings, and first to FIG. 1, there is shown a generally cylindrical closed reaction vessel 20 having an inlet 22 through which flowable material 23 (e.g., a viscous, incompletely polymerized molten polyethylene terephthalate) is introduced and an outlet 24 through which the material is discharged. The material is propelled from the inlet 22, through the outlet 24, and mixed and agitated and subjected to large surface exposure en route by means of a rotary propulsion structure 26, to be described more fully hereinbelow. The vessel 20 is of a conventional heat-jacketed double-wall construction, having an interior side wall 28 and interior end walls 30, 32 for confining the material to be processed, and an outer side wall 34 and outer end walls 36, 38 which define, with the interior walls 28, 30, 32, a heat transfer jacket space 40 into which a heat or cooling medium may be introduced to heat or cool the process material 23. A vapor or gas connection 50 is provided to the interior of the upper portion of the vessel 20 for the removal or introduction of gases or vapors—e.g., in the case where polyethylene terephthalate is being polymerized, the removal of the glycol and/or water vapors evolved.

The propelling structure 26 is more particularly shown in FIG. 3 as comprising a rotary shaft 52 journalled upon bearings 51 and 53 (FIG. 1) driven by mechanisms not shown in a counter-clockwise direction as seen in FIG. 2 and having mounted thereon to rotate therewith, a series of discoidal elements 54a to 54s. The axis of the shaft 52 is not normal to the planes of the discs 54a to 54s, but rather each disc is inclined away from normality to that axis. This is easiest seen in the case of disc 54d, wherein the axis of tipping is a horizontal line perpendicular to the plane of the drawing and to the axis of the shaft 52, and the disc makes an angle $\alpha$ with a plane 55 perpendicular to the shaft 52. It will be seen that the periphery of the disc 54d has a trailing point 56 which is farthest to the left, i.e. closest to the intake 52 of the apparatus. In a similar manner disc 54e is also tipped away from normality with respect to the axis of shaft 52, but in this case, the axis of tipping is again a line perpendicular to the axis of shaft 52, but is angularly displaced from the axis of tipping of its neighboring leftward disc 54d by 45° (clockwise as viewed from the left in FIG. 3) so that the trailing point 56 on this disc 54e is displaced by 45° (clockwise from the left in FIG. 3) from the trailing point 56 on the discs 54. Similarly the axis of tipping of the disc 54f is angularly displaced by a further 45° (clockwise, as before) so that its trailing point 56 is also displaced by a further 45° (clockwise, as before) from the trailing point of the disc 54e, and so on, each successive disc having its axis of tilting and consequently its trailing point 56, displaced by a further 45° (clockwise, in each case) from the axis of tilting and trailing point of its predecessor. The same system of progressive angular displacement of tilt axis and trailing points 56 also applies to discs 54a, b, and c. The net result is that the trailing points 56 of the discs 54a to s all fall on the helicoidal dot-dash line 58 of FIG. 3. It has been found empirically by the present inventors that such an assemblage of discoidal elements, disposed in the manner described, when rotated about the axis of the assemblage, will effect a propulsion of flowable materials engaged thereby in a direction parallel to the axis and in the same direction as would a worm-screw having the same direction of rotation as the structure 26 and same sense as the helicoidal line 58 on which the trailing points 56 lie. This is true, notwithstanding the fact that a single tilted disc, or an array of tilted discs in which the trailing points are not helicoidally arranged, will not give any net propulsive effect, but will merely move the material to and fro.

Figure 4:
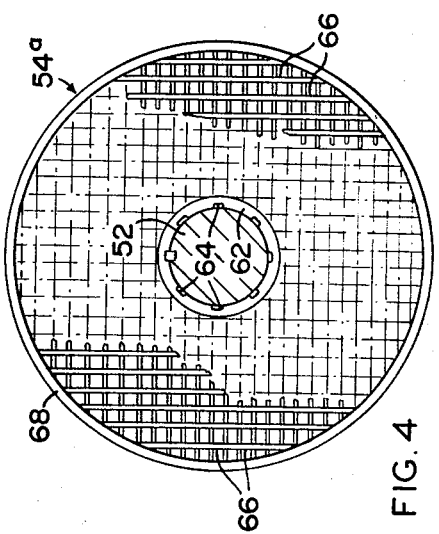

The construction of the individual discs is quite simple and uncomplicated compared with the helicoidal screw worms heretofore employed, as will be evident from FIG. 4. This construction comprises a cylindrical collar or hub 62 frictionaly embracing the shaft 52 which is splined to the hub 62 by splines 64. A flat circular sheet 66 of steel mesh or perforated plate or expanded metal is welded to the periphery of the hub (the plane of the sheet being tipped away from normality to the axis of shaft 52 as explained in connection with FIG. 3) and a reinforcing rim-hoop 68 of steel is welded to the periphery of the steel mesh. Thus there is provided a foraminated disc of simple construction affixed to the shaft 52 and tilted away from normality to the axis of the shaft so as to provide a propulsion element suitable for use in this invention.

As noted above it is preferred that the discoidal propulsion elements be foraminated, the advantage being an improved agitation and surface exposure of the material being processed. Referring to FIGS. 1 and 2, there will be seen a pool 23 of material in process being propelled through the equipment by the propulsion assembly 26, of which the disc 54j comprising the mesh 66 is one element. As seen in FIG. 2, its rotary movement, the foraminous disc 66 is dragged through the pool 23 so that the wire of its meshes effects a splitting, quartering, and mixing action thereon, and also drags the pool as a whole over to the right hand wall of the reactor 20 so as to expose a greater area thereof. Also some of the material in process clings to the meshes and is carried up out of the pool 23 by the rotation of the disc 66 so as to expose further areas thereof. It will be appreciated that these actions are much more effective with a foraminous disc, i.e., one made of screening, or of perforated or expanded metal sheet, constituted of a spoked wheel, etc., than with a plain smooth disc, although this last is by no means to be excluded from the scope of the invention.

It will be understood that the spacing of the discs 54a to s need not be uniform but may vary also the length of the shaft 52, and that the helicoidal line 58 need not be a perfect helix, providing only that it progresses generally in one direction with angular displacement about the axis of the shaft 52. In order to provide for the arbitrary adjustment of these geometrical matters, there are provided spacing collars 70 and 72 interposed as seems desirable between the hubs 62 of the selected propulsion elements. For instance, the characteristics of the process material 23 may progressively vary as it moves through the apparatus—for instance, polyethylene terephthalate increases in viscosity as its polymerization progresses. Accordingly, the spacing is increased at the discharge end of the apparatus by insertion of the spacer 72. It is understood, of course, that the same adjustment of spacing can be secured in other ways, as by increasing the lengths of the hubs 62 or by simply securing the hubs 62 to the shaft 52 in the desired positions without necessarily abutting the hubs.

Figure 6:
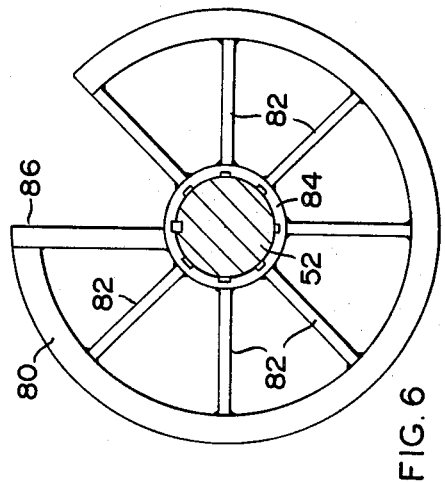
Figure 5:
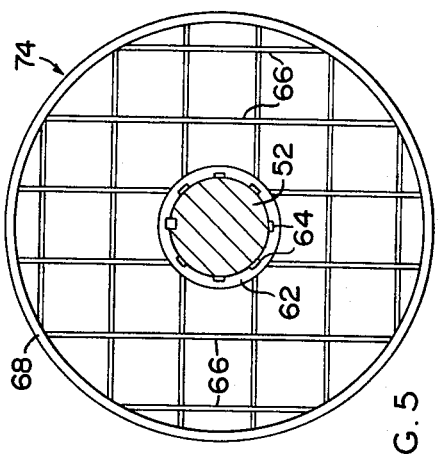

Special configurations are provided at the discharge end of the propulsion structure 26. Affixed to the shaft 52 is a simple foraminous disc element 74 similar to that of FIG. 4 except that it is not tipped with respect to the shaft 52 as are the discs 54a etc., but rather the axis of the shaft is normal to this disc. The function of the disc 74 is to curb and regulate the overflow of the process material 23 down the discharge 24. Also it has been found that the process material tends to be thrown against, and adhere to, the end wall 32. In order to remove this material from the end wall 32 and restore it to the general stream, there is provided a helically formed sheet metal ribbon scraper blade 80 (FIGS. 1, 3, and 6) carried by spokes 82, radiating from a hub 84 splined to the shaft 52. The leading edge 86 of the scraper blade revolves in close clearance with the end wall 32 and removes deposits therefrom, which deposits are propelled back by the helical ramp of the blade 80 so as to be discharged at 24.

The disc elements 54a etc. need not be made of wire screening, but may be constructed in any other way which will provide a discoidal configuration provided with apertures. In FIG. 7 is shown a discoidal propulsion element in the form of a spoked wheel comprising a hub 88 splined to the shaft 52, and attached by way of spokes 90 to a rim 92. Alternatively, in FIG. 10, there is shown a propulsion element comprising a hub 94 having welded thereto a steel plate disc 96 having perforations 98 pierced therethrough. A reinforcing rim 100 is welded to the periphery of the disc 96. Both of the discoidal elements of FIGS. 7 and 10 are, of course, tilted away from normality with respect to the axis of the shaft 52.

The angle at which the discoidal elements are tipped away from being normal may vary widely, depending upon the nature of the material to be operated upon. For instance, angles as low as 1.5° and as high as 45° have been found effective, the preferred range being 2° to 20°. Also the angle need not be the same at all points along the apparatus; for instance, in an apparatus for completing the polymerization of polyethylene terephthalate, where the viscosity of the mass increases, it has been found desirable to progressively increase the angle of tip of the successive discs along the length of the shaft, beginning at about 2° and ending at 7° at the outlet.

FIGS. 8 and 9 show an embodiment in which the propulsion disc elements 54a to s, instead of being carried on a central rotating shaft, are affixed to a peripheral rotating cage. The construction includes two stub shafts 110 and 112 at the ends of the structure disposed coaxially of each other and joined together by a cage comprising radial spokes 114 welded at their inner ends to the shafts 110 and 112 and at their outer ends to longitudinal stringer members 116. An array of foraminous discs 120a to 120s, identical respectively in construction and geometrical arrangement to the foraminous discs 54a to 54s (except that they have no central hubs 62) is carried on the cage, the stringer members 116 passing through, and being welded to, the edge portions of the discs 120a to s. The entire rotary structure of FIGS. 7 and 8 may be substituted for the rotary structure of FIG. 2 in the apparatus of FIG. 1, the stub shafts 110 and 112 being journalled in the bearings 51 and 53, and being driven by suitable power means, just as in the case of shaft 52.

As noted above, it has been experimentally demonstrated that the rotation of the propulsion element of this invention does in fact effect a net longitudinal displacement of flowable materials with which it is engaged. Over and above this, however, this action may be substantiated and elucidated by the following calculations:

Let:

$t$ = time $\overline{V}$ = vector representing the instantaneous velocity in space, at $\overline{R}$, $\theta$, and $t$ $\overline{P}$ = momentum vector ($M\overline{V}$)

$\overline{a}$ = vector acceleration of element $\theta$ = position ∡ for $\overline{R}$ (direction)

$o$ = center of rotation, disc, or origin $m$ = mass of element (macroscopic)

$\overline{R}$ = position vector, to element $s$ = disc or generating surface $\overline{V}_t$ = tangential velocity vector, caused by $\overline{\omega}$.

Figure 11:
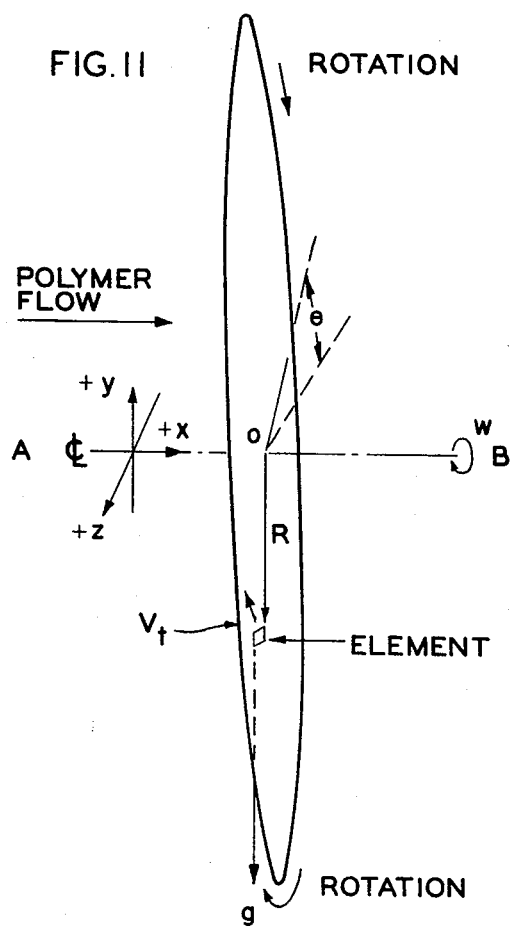
FIGS. 11–14 are schematic diagrams in aid of a mathematical analysis of the action of the apparatus of this invention.

₵ = axis of symmetry or rotation $\omega$ = angular velocity of shaft (I) Axial thrust generated from tilt configuration Consider the body (element) forces shown in FIG. 11.

Latter forces are exerted by the element only, originating from the angular motion of the generating surface (disc). Also, the author assumes phenomenon on a macroscopic scale, where shearing stress forces, deformation of a differential element, etc., have been neglected momentarily.

Figure 13:
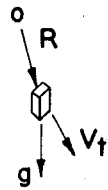

Removing the element from FIG. 11, we have the configuration of FIG. 13. Note that $\overline{R}$ and $\overline{V}_t$ are in the plane of the disc.

The angular velocity vector for the element may be expressed by:

$$\overline{\omega} = \overline{R} \times \overline{V}_t$$

Also, $\overline{V}$ (defined by $\overline{V} = v_x\overline{i} + v_y\overline{j} + v_z\overline{k}$) will vary according to:

$$|\overline{V}| = \mathcal{F}(\overline{R}, [\theta - \theta_0])$$

where $$\theta = F \text{ (time)}$$

let $$\theta_0 = t_0 \text{ and } \theta = 360° = t^1$$

From Newton's second law:

$$F = m\frac{dv}{dt} = \frac{dp}{dt} = ma$$

$$dv/dt = \frac{1}{m}F$$

$$dv = F/m \, dt \text{ and } v = \int_{t_0}^{t^1} F/m \, dt$$

Since $m$ is $\mathcal{F}$ (time [related to I.V.]), we can't bring $m$ outside the integral sign.

The purpose of deriving latter $$\left(v = \int_{t_0}^{t^1} F/m \, dt\right)$$

was to show $|\overline{V}| = \mathcal{F}(F, m, t)$, or $|\overline{F}| = \mathcal{F}(v, m, t)$; i.e., $|\overline{V}|$ can be considered as a $|\overline{F}|$ on the fluid element.

Consider the following:

$$\overline{g} = \overline{F}/m$$

where $\overline{g} = g_x\overline{i} + g_y\overline{j} + g_z\overline{k}$

Now $\overline{F}^1 = \overline{g}m$ or $\overline{g}$ may be considered as a force ($\overline{F}^1$) Also, $$V\overline{g} = 0 = \frac{\partial g}{\partial x}\overline{i} + \frac{\partial g}{\partial y}\overline{j} + \frac{\partial g}{\partial z}\overline{k}$$

It is assumed $$\partial g \partial_x \overline{i} \text{ and } \frac{\partial g}{\partial z}\overline{k}$$

are $o$—vessel is horizontal

∴ we may assume a net force acting on the element $$= \overline{F} \text{ (from } \overline{V}\text{)} + \overline{F}^1 \text{ (from } \overline{g}\text{)}$$

$$\sum_{i=1}^{n}(F) = \overline{F}^{11} = \overline{F} + \overline{F}^1$$

Figure 14:
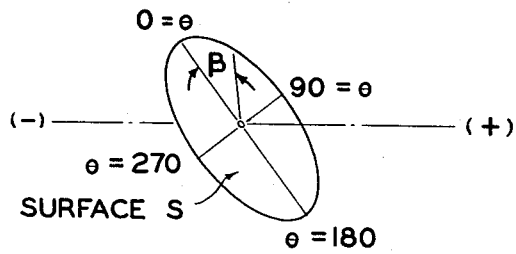

Note that $\overline{F}^{11}$ is constantly changing direction and is related to the direction of rotation and tilt. Consider the diagram of FIG. 14. Assume S contacts fluid for $$90° \leq \theta \leq 270°$$

Then $\overline{F}^{11}$ would be (+) for $90° \leq \theta \leq 180°$. For $$180° \leq \theta \leq 270°$$

$\overline{F}^{11}$ would be (−). If the tilt was $+\beta$, the same phenomenon would occur; i.e., for $90° \leq \theta \leq 270°$, $$\sum_{i=1}^{n}\overline{F}^{11}$$

would approach zero.

Thus, qualitatively, we would expect $\bar{F}^{11}$ alone to produce very little or no axial thrust.

Another concept that relates to the $\bar{F}^{11}$ produced above, is the conservation of angular momentum. Consider a "spinning top." The top stays vertical due to the moment (in Plane $\bar{y}$ to $\bar{\omega}$) generated by the angular velocity vector in the vertical direction (directed along centerline of top and upward).

On a macroscopic scale, the fluid element (FIG. 11) is similar to the top, but angular momentum is now in the (+) axial direction. Thus, by conservation of angular momentum, a net positive thrust is generated.

Again, the angle of rotation is critical, where the "right hand rule" ($\bar{R} \times \bar{V}$) gives us the direction of the angular velocity vector.

Angular rotation vector direction is given by following:

Rotate $\bar{R}$ into $\bar{V}_t$ ($\bar{R} \times \bar{V}_t$) for $\theta < 180°$ and note resultant vector positive when $\bar{R}$ is rotated clockwise into $\bar{V}_t$. Thus, $\bar{\omega}$ is (+) for our case—axial flow direction.

Assuming conservation of mass:

For macroscopic flow:

Rate of mass accum.=$(m_{in} - m_{out})$, and it can be shown, eq. of continuity equals:

$$\partial \rho / \partial t = -\nabla \cdot \rho \bar{V} \text{ (fixed pt.)}$$
$$\rho = \text{density (fixed pt.)}$$

where $\partial \rho / \partial t =$ accum.$= o$ for our case.

$$-\nabla \cdot \rho v = o \ *$$

or $$\nabla \cdot \rho \bar{v} = o$$

where $\rho \bar{v} =$ mass velocity vector.

eq. * says that rate of $\Delta$ of $\rho$ at any point is $\bar{y}(\rho \bar{v})$. However, since $\Delta \cdot \rho \bar{v} = o$ or there is no $\Delta$ (i.e., rate of $\Delta$), the mass velocity vector is constant, or mass is transferred by above forces. Note than $\bar{v}$ is in reality $\rho \bar{v}$.

The equation of continuity for our system may also be expressed as:

$$\frac{D}{Dt}(\rho) = -\rho(\nabla \cdot \bar{v}) + \frac{\partial \rho}{\partial t}$$

However, we have proven $$-\rho(\nabla \cdot \bar{v}) = o$$

so $$\frac{D(\rho)}{Dt} = +\frac{\partial \rho}{\partial t}$$

here $\partial \rho / \partial t \neq o$ and $D(\rho)/Dt$ is +, indicating, $\partial \rho / \partial t$ is only > as we increase length or position vessel; therefore, axial displacement must occur by above.

(II) Axial thrust generated by "lead" component

Gyroscopic effects are present in all types of machines, where rotating components are forced to turn about axes other than their axes of spin.

Figure 12:
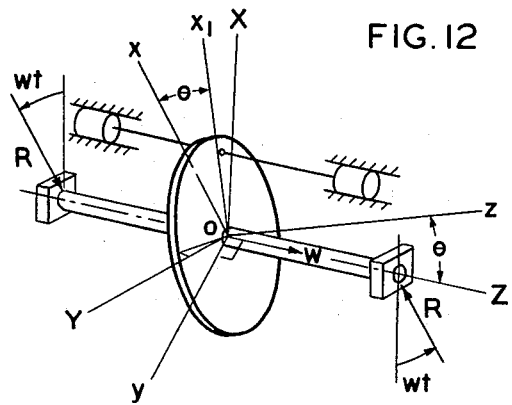

Consider an inclined disc on a shaft (see FIG. 12). The shaft rotates at a constant angular velocity $\bar{\omega}$ about a fixed axis—OZ. The particular arrangement shown (including pistons and disc) is found in "swash-plate" pumps, the oscillating motion of the disc being used to provide reciprocating motion to pistons sliding in fixed cylinders disposed at equal angular positions around the axis.

Let the center of mass of the disc lie on the axis of the shaft at $o$ and assume the shaft to be perfectly still. If O$xyz$ are the principal axes of the disc at $o$, where O$y$ is $\perp$ to OZ, then the angular velocities of the disc about O$xyz$ are $-\omega \sin \theta, o, \omega \cos \theta$; where $\theta$ is the angle zOZ. Also, if (A, A, C) denote the principal moments of inertia of the disc for O, then from Euler's equations we obtain:

(1) $\qquad T_1 = O$ (2) $\qquad T_2 = (C-A)\omega^2 \sin \theta \cos \theta$ (3) $\qquad T_3 = O$ Equations 1 to 3 (above) define the component couples exerted on the disc, those exerted on the shaft being equal and opposite. Note that couple $T_2$ increases as the square of the speed of rotation ($\omega$), but varies almost linearly with $\theta$ (for small $\theta^1 s$).

Assume $n$ pistons and rods of mass $m$ to the equality spaced at radius $r$ around the shaft on each side of the disc. Taking the first pair in plane OYZ, OY and O$y$ being equal at $t = o$, the axial displacement of the $s$th pair may be written:

$$Z_s = r \sin \left\{ \frac{2\pi(s-1)}{n} - \omega t \right\} \tan \theta$$

Note $$\left\{ \frac{2(s-1)}{n} - \omega t \right\}$$

is the angle between O$y$ and the radius drawn from O to the center line of the $s$th piston.

When $\theta = 360°$, or when the disc has moved one complete revolution, total displacement (considering both pistons) is zero. This would also be true for the discs if all the discs had the same tilt and no lead.

If we now consider the same discs as in FIG. 12, but add another disc with the same tilt and 45° lead (O$xyz$ for the 2nd disc is at $\theta = 45°$), it is obvious that for $\theta = 360°$, there will be a net axial thrust or displacement ($Z_s$). Note that the latter statement is true for both discs considered simultaneously, not independently.

The net axial displacement or thrust component is attributed to the following:

Consider the disc and piston configuration shown in FIG. 12. Now add a second disc with same piston configuration (same $r$ and O$xyz$ orientation) but rotated 45° relative to first disc.

If $t_0$ represents piston displacement at $\theta = 0°$, then define $Z_s = 0$. For the second disc, $Z_s$ would only equal to zero if lead $= 0$. Since lead $= 45°$, then axial displacement or thrust has been exerted in the Z direction, and $Z_s$ is a positive number $> 0$. Note that $Z_s \propto$ to an "axial inertia force" or thrust.

From the foregoing general description and detailed specification it will be evident that this invention provides a novel and easily constructed apparatus for mixing, propelling, and reacting flowable materials. The apparatus will be seen to have especial application in the production of polyesters and other polymerization reactions.

We claim:

1. An apparatus for mixing and forwarding a flowable material lengthwise of a given axis (A) comprising
   a rotary carrier arranged to rotate about said axis (A), one selected end of said axis (A) hereinafter being designated the "reference" end and
   a plurality of discs
      spaced apart and disposed along the axis (A) about which said carrier rotates
      and secured to said carrier in fixed relation thereto to rotate therewith,
      the center of each disc being substantially at said axis (A)
      each of said discs being tipped about an axis of tipping which is a line perpendicular to said axis (A) and thereby being inclined away from normality to said axis, so that one point, hereinafter designated the "trailing point," on the periphery of each disc is closer than any other point on that disc to the reference end of said axis and the axis of tipping of each successive disc being progressively angularly displaced with respect to the axis of tipping of its neighboring preceding disc, so that the trailing points of the successive discs are disposed along a helicoidal line substantially coaxial with said axis.

2. Apparatus according to claim 1, wherein said discs are foraminated.

3. Apparatus according to claim 2, wherein said discs are spaced more closely at one end of said carrier than at the other end.

4. Apparatus according to claim 2, wherein said discs are constructed of screening material.

5. An apparatus for continuously receiving, agitating, and discharging a flowable material comprising
a vessel having
an inlet for receiving said material and
an outlet, spaced from said inlet for discharging said material
a rotary carrier
disposed within said vessel and arranged to rotate about an axis (A) extending generally in a direction from said inlet to said outlet, the end of said axis (A) nearest said inlet hereinafter being designated the "reference" and
a plurality of discs
spaced apart and disposed along the axis (A) about which said carrier rotates and secured to said carrier in fixed relation thereto to rotate therewith,
the center of each disc being substantially at said axis (A)
each of said discs being tipped about an axis of tipping which is a line perpendicular to said axis (A) and thereby being inclined away from normality to said axis, so that one point, hereinafter designated the "trailing point," on the periphery of each disc is closer than any other point on that disc to the reference end of said axis and
the axis of tipping of each successive disc being progressively angularly displaced with respect to the axis of tipping of its neighboring preceding disc, so that the trailing points of the successive discs are disposed along a helicoidal line substantially coaxial with said axis.

6. An apparatus according to claim 5, wherein said vessel is a closed vessel, and a conduit is connected to said vessel for removal of vaporous and/or gaseous products.

7. An apparatus according to claim 6, wherein the discs are foraminated.

8. Apparatus according to claim 6, wherein the vessel comprises a bottom half, the interior of which conforms to a cylinder coaxial with said axis and has close clearance with peripheries of said discs.

9. Apparatus according to claim 8, wherein the vessel has an end wall at the discharge end, which end wall is a surface of revolution with respect to said axis, and said carrier has attached thereto a helicoidal scraping blade bearing upon said end wall to remove the flowable material therefrom.

10. Apparatus according to claim 7, wherein the carrier comprises a rotary shaft extending through the centers of said discs, and discs being attached to said shaft.

11. Apparatus according to claim 7, wherein said carrier comprises
two stub shafts,
one at each end of said carrier and
disposed coaxially of each other, and
a cage structure embracing said discs,
attached to said stub-shafts and also attached to said discs near the peripheries thereof.

12. Apparatus according to claim 6, wherein the discs are more closely spaced at one end of the carrier than at the other end.

13. Apparatus according to claim 6, wherein the foramina in the discs are longer at one end of the carrier than at the other end.

14. Apparatus according to claim 6, wherein the inclination of the discs away from normality to said axis is greater at one end of said carrier than at the other end.

References Cited

UNITED STATES PATENTS

| 2,869,838 | 1/1959 | Ryder | 259—9 |
| 3,046,099 | 7/1962 | Willey | 23—285 |
| 147,717 | 2/1874 | Warren | 261—92 UX |

FOREIGN PATENTS

| 93,255 | 6/1955 | Germany | 415—90 |

JAMES T. TAYMAN, Jr., Primary Examiner

U.S. Cl. X.R.

18—125 B; 23—1 R, 252—R; 159—11 B; 198—216; 259—9, 10, 109, 110; 260—75 M; 261—92; 416—202, 203

UNITED STATES PATENT OFFICE
CERTIFICATE OF CORRECTION

Patent No. 3,684,458          Dated August 15, 1972

Inventor(s) William L. McCammon and George E. Bishop

It is certified that error appears in the above-identified patent and that said Letters Patent are hereby corrected as shown below:

Col. 2, line 59
   "accompany" should be -- accompanying --

Col. 3, line 22
   "heat" should be -- heating --

Col. 6, line 51
   "$\partial g \partial_x \bar{1}$" should be -- $\frac{\partial g}{\partial x} \bar{1}$ --

Col. 7, line 1
   "F" should be -- $\bar{F}^{11}$ --

Col. 7, line 6
   "F" should be a perpendicular sign -- ( $\perp$ ) --

Col. 7, line 24
   "Q" should be -- ) --

Col. 10, line 43
   "93,255" should be -- 932,556 --

Col. 8, line 33
   "discs" should be -- disc --

Signed and sealed this 18th day of December 1973.

(SEAL)
Attest:

EDWARD M. FLETCHER, JR.          RENE D. TEGTMEYER
Attesting Officer                Acting Commissioner of Patent